Patented May 29, 1951

2,554,842

UNITED STATES PATENT OFFICE 2,554,842

OCTAHYDROISOQUINOLINE DERIVATIVES

Otto Schnider and André Grüssner, Basel, Switzerland, assignors to Hoffmann-La Roche, Inc., Nutley, N. J., a corporation of New Jersey No Drawing. Original application September 13, 1947, Serial No. 773,934. Divided and this application February 23, 1950, Serial No. 153,292. In Switzerland October 2, 1946

2 Claims. (Cl. 260—289)

It was found, according to the present invention, that derivatives of 1′-methyl-piperido-[2′.3′.4′:9,14,13] - 5.6.7.8.9.10.13.14 - octahydrophenanthrene of the formula

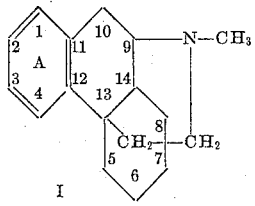

which carry substituents in the aromatic nucleus A possess valuable analgesic properties. Furthermore, they are valuable starting materials for the preparation of further hydrophenanthrene derivatives since the presence of the substituents in nucleus A facilitates the introduction of further substituents.

In the new process for the manufacture of the said compounds halogen-methylates of 5.6.7.8-tetrahydro-isoquinoline and substituted benzyl-magnesiumhalides serve as starting materials. The former may be obtained by reacting 1.3-dihydroxy-5.6.7.8-tetrahydro-isoquinoline [Chemisches Zentralblatt, year 1933, vol. I, page 593] with phosphorus oxychloride under elevated pressure; 1.3 - dichloro - 5.6.7.8 - tetrahydro-isoquinoline is obtained which may be hydrogenated to 5.6.7.8-tetrahydro-isoquinoline, the latter, on treatment with a methylhalide, yielding the corresponding halogenomethylate. As the second starting material such benzylhalides will be elected which carry substituents not interfering with the preparation of a Grignard compound; at least one of o-positions with respect to the halogeno-methyl substituent must be unsubstituted. Lower saturated alkyl- and alkoxy radicals will preferably be chosen as substituents.

The new process comprises reacting 5.6.7.8-tetrahydro-isoquinoline halogenomethylate with an appropriately substituted benzyl-magnesium-halide, reducing the substituted 1-benzyl-2.-methyl - 1.2.5.6.7.8 - hexahydro - isoquinoline formed and heating the octahydro-isoquinoline derivative obtained with phosphoric acid. The process may, for instance, be worked by starting out from 5.6.7.8-tetrahydro-isoquinoline-iodomethylate and 3.4-dimethylbenzyl-magnesium-chloride or p-methoxybenzyl-magnesium-bromide or m-methoxybenzyl-magnesium-bromide, respectively. The process may be illustrated by the following formulae:

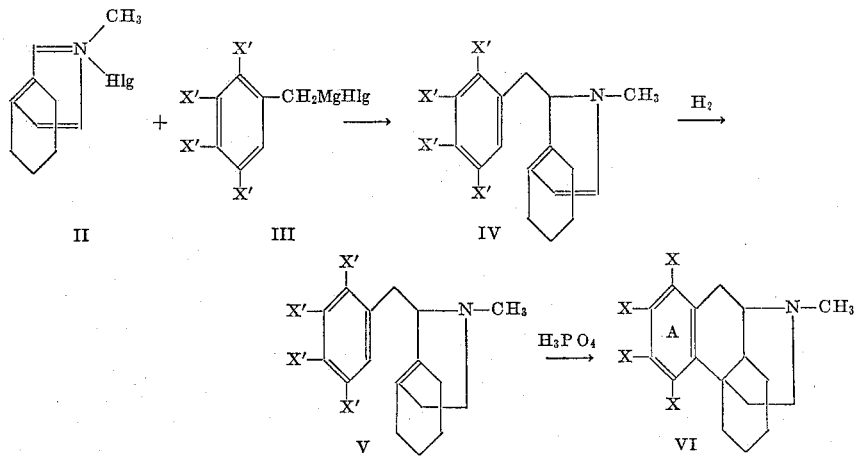

In the above formula X′ are hydrogen or substituents allowing, while remaining unchanged, the formation of the Grignard compound III from the corresponding benzyl compound, preferably lower saturated alkyl or alkoxy radicals. X stands for the same radicals as X′ or the products of transformation thereof during the claimed process; thus, X means especially lower saturated alkyl, hydroxy or alkoxy radicals.

The new compounds have the properties of a base, they are distillable and sublimable; with acids they form salts. They are for the manufacture of medicinal preparations.

Example 1

165 parts by weight of 1.3-dihydroxy-5.6.7.8-tetrahydro-isoquinoline and 270 parts by volume of phosphorus oxychloride are heated in an autoclave to 170–180° C. during 2 to 3 hours. The reaction product is poured on to ice and the crystals, which have separated, are filtered by suction and well washed with water. The crude 1.3-dichloro-5.6.7.8-tetrahydro-isoquinoline is purified by distillation in vacuo. (Boiling point under 12 mm. Hg 167–171° C.) By recrystallisation from methanol its melting point is found to be at 85° C.

A solution of 202 parts by weight of 1.3-dichloro-5.6.7.8-tetrahydro-isoquinoline in 2000 parts by volume of methanol is hydrogenated under a pressure of 3 atmospheres in the presence of a palladium charcoal catalyst. After the calculated quantity of hydrogen has been taken up, the catalyst is filtered off and the methanol solution is concentrated to dryness. The residue is taken up in water, the aqueous solution is made alkaline and the freed base is taken up in ether. The 5.6.7.8-tetrahydro-isoquinoline remaining behind after evaporation of the ether is distilled in vacuo, and boils under a pressure of 13 mm. Hg at 106–108° C.

142 parts by weight of methyl iodide are added to a solution of 133 parts by weight of 5.6.7.8-tetrahydro-isoquinoline in 300 parts by volume of acetone. After the mixture has stood for 24 hours, the methiodide of 5.6.7.8-tetrahydro-isoquinoline (II), which has precipitated, is removed by suctional filtration and dried. If 94 parts by weight of methyl bromide are used in place of the methyl iodide, the well crystallised bromomethylate of 5.6.7.8-tetrahydro-isoquinoline is obtained.

To a Grignard solution, obtained from 40 parts by weight of magnesium in 800 parts by volume of absolute ether and 250 parts by weight of 3.4-dimethyl-benzyl chloride, 275 parts by weight of finely pulverised 5.6.7.8-tetrahydro-isoquinoline-iodomethylate or 225 parts weight of 5.6.7.8-tetrahydro-isoquinoline-bromomethylate are added in portions while stirring and at a temperature ranging from 0° to 5° C. the halogeno-methylate quickly dissolves. After addition of the whole quantity, stirring is continued for a further hour at about 0° C.

Thereupon the mixture is poured on to ice, the base is precipitated by means of saturated ammonium chloride solution and ammonia. The ether solution is separated off. Its basic portions are extracted by means of about 1000 parts by volume of ice-cold normal hydrochloric acid. The cold hydrochloric acid solution is, either directly subjected to hydrogenation, or the basic portion is again precipitated with ammonia, taken up in ether and, after removal of the ether, distilled in high vacuo. Boiling point under a pressure of 0.03 mm. Hg 134–137° C.

267 parts by weight of the 1-(3'.4'-dimethylbenzyl) - 2 - methyl - 1.2.5.6.7.8 - hexahydro - isoquinoline (IV), which is sensitive to air, are dissolved, in the cold, in 1000 parts by volume of normal hydrochloric acid. This solution is hydrogenated in a hydrogen atmosphere at slightly excess pressure with 200 parts by weight of a palladium charcoal catalyst (corresponding to 2 parts by weight of palladium). The calculated quantity of hydrogen is taken up in short time. After separation from the catalyst, the solution is made alkaline with ammonia, the base is taken up in benzene and distilled. It boils under a pressure of 0.03 mm. Hg at 120–124° C. The hydrobromide melts at 178–180° C., the picrate at 124–126° C.

269 parts by weight of 1-(3'.4'-dimethylbenzyl) - 2 - methyl - 1.2.3.4.5.6.7.8 - octahydro - isoquinoline (V) are heated with 2400 parts by weight of 90 per cent phosphoric acid for 72 hours at 150° C. The reaction mixture is then cooled down, the base is taken up in benzene and distilled in high vacuo. It boils under a pressure of 0.01 mm. Hg at 121–123° C. The 1'-methyl-piperido - [2'.3'.4':9.14.13]-3.4-dimethyl-5.6.7.8.-9.10.13.14-octahydro-phenanthrene (VI) is little soluble in water, but easily soluble in alcohol and ether. With acids it forms salts. The picrate melts at 198–200° C., the hydrobromide at 217–218° C.

*Example 2*

In an analogous manner as described in Example 1, 1-(p-methoxy - benzyl) - 2 - methyl-1.2.5.6.7.8-hexahydro - isoquinoline is prepared from p-methoxy-benzyl bromide according to the Grignard method and by means of the iodomethylate of 5.6.7.8-tetrahydro-isoquinoline. Its boiling point under a pressure of 0.2 mm. Hg is 149–154° C.

From the latter compound 1-(p-methoxy-benzyl) - 2-methyl-1.2.3.4.5.6.7.8-octahydro-isoquinoline is obtained by catalytic hydrogenation in the presence of a platinum oxide or palladium charcoal catalyst. Its boiling point under a pressure of 0.12 mm. Hg is 138–142° C. The hydrochloride melts at 149.5 to 151.5° C.

271 parts by weight of 1-(p-methoxy-benzyl) - 2 - methyl - 1.2.3.4.5.6.7.8-octahydro-isoquinoline are heated with 2700 parts by weight of phosphoric acid (specific gravity 1.75) for 3 days at 150° C. While cooling with ice, the cooled slightly brown coloured solution is made slightly alkaline to phenolphtalein by means of ammonia. The crude base thus set free can be purified either by sublimation in high vacuo (pressure 0.3 mm. Hg, temperature of the oil-bath 180–210° C.) or by recrystallisation from anisole or by passing through the salts. In the greatest part of the compound the methyl radical has been split off from the methoxy substituent in the aromatic nucleus during the heating with phosphoric acid. The 1' - methyl-piperido-[2'.3'.4':9.14.13]-3-hydroxy-5.6.7.8.9.10.13.14-octahydro - phenanthrene (3-hydroxy-N-methyl-morphinan) melts at 251–253° C. It is sparingly soluble in water, more easily soluble in alcohol and ether, and still more easily soluble in chloroform and anisole. It is dissolved by strong alkalis. With acids it forms salts. The hydrobromide melts at 193–194° C. By acetylating the above compound 1'-methyl-piperido-[2'.3'.4':9.14.13]-3-acetoxy-5.6.7.8.9.10.-13.14-octahydro-phenanthrene is obtained the hydrobromide of which contains ½ mol of crystal water and melts at 210–212° C.

In a minor part of the mixture obtained by the last reaction step the methyl ether radical is not hydrolised, 1'-methyl-piperido-[2'.3'.4':9.14.13]-3-methoxy-5.6.7.8.9.10.13.14-octahydro - phenanthrene melting at 181–183° C. thus being obtained; the hydrobromide thereof, which contains crystal water, melts at 91–93° C.

*Example 3*

In accordance with the process described in Example 1 the Grignard compound obtained from m-methoxybenzyl-bromide is reacted with the bromomethylate of 5.6.7.8-tetrahydro-isoquinoline whereby 1-(m-methoxybenzyl)-2-methyl-1.2.5.6.7.8-hexahydroisoquinoline of boiling point under 0.02 mm. Hg of 139–146° C. is obtained.

From the said compound 1-(m-methoxybenzyl)-2-methyl-1.2.3.4.5.6.7.8 - octahydro - isoquinoline is obtained by the aid of hydrogen and palladium precipitated on coal. The hydrochloride of the said compound melts at 116–118° C.

80 parts by weight of the above base are mixed with 800 parts by volume of 87 per cent. phosphoric acid and heated to 150° C. for 3 days. After cooling down the solution is poured on ice and set weakly alkaline to phenolthtaleine by the aid of 20 per cent. ammonia The base which precipitates consists of 1'-methyl - piperido-[2'.3'.4':9.14.13]-2 (or 4-)-hydroxy-5.6.7.8.9.10.-13.14-octahydro-phenanthrene, formed by cyclisation with simultaneous saponification of the methyl-ether. The said base may be purified by dissolution and precipitation of the hydrochloride and recrystallisation from diluted alcohol. It melts at 93–95° C., is hardly soluble in water and rather difficultly in alcohol and ether. It dissolves in dilute sodium-hydroxide solution, but not in soda solution. The hydrobromide thereof on crystallisation from water contains crystal water.

This application is a division of our co-pending application Ser. No. 773,934, filed September 13, 1947, now Patent No. 2,524,855, issued October 10, 1950.

We claim:

1. A compound selected from the group consisting of 1-(p-methoxy - benzyl) - 2 - methyl-1,2,3,4,5,6,7,8-octahydroisoquinoline and its acid addition salts.

2. 1-(p-methoxy-benzyl)-2-methyl-1,2,3,4,5,6,-7,8-octahydroisoquinoline.

OTTO SCHNIDER.
ANDRÉ GRÜSSNER.

No references cited.